United States Patent
Silva (10) Patent No.: US 8,322,243 B2
(45) Date of Patent: Dec. 4, 2012

(54) TRANSMISSION WITH REVERSE IDLER GEAR BRAKE

(75) Inventor: Renato Freitas Silva, Santo André (BR)

(73) Assignee: GM Global Technology Operations LLC, Detroit, MI (US)

( * ) Notice: Subject to any disclaimer, the term of this patent is extended or adjusted under 35 U.S.C. 154(b) by 426 days.

(21) Appl. No.: 12/751,683

(22) Filed: Mar. 31, 2010

(65) Prior Publication Data

US 2011/0239796 A1  Oct. 6, 2011

(51) Int. Cl.
*F16H 3/12* (2006.01)

(52) U.S. Cl. .... 74/339; 74/411.5; 192/53.33; 192/53.35

(58) Field of Classification Search ............... 74/339, 74/411.5; 192/53.31, 53.32, 53.33, 53.35
See application file for complete search history.

(56) References Cited

U.S. PATENT DOCUMENTS

| | | | | |
|---|---|---|---|---|
| 1,810,494 A * | 6/1931 | Murray | | 74/339 |
| 1,822,107 A * | 9/1931 | Murray | | 74/339 |
| 1,838,946 A * | 12/1931 | Kelley | | 74/375 |
| 2,101,827 A * | 12/1937 | Thompson | | 74/339 |
| 2,942,712 A * | 6/1960 | Altmann | | 192/114 T |
| 3,175,413 A * | 3/1965 | Peras | | 74/339 |
| 3,745,847 A * | 7/1973 | Worner et al. | | 74/339 |

FOREIGN PATENT DOCUMENTS

DE  41 06 946   * 9/1992
JP  4-181046    * 6/1992

* cited by examiner

*Primary Examiner* — William C Joyce (57) ABSTRACT

A transmission is disclosed having an input shaft or member, an output shaft or member, a plurality of meshing gears, a plurality of synchronizers and a reverse idler gear assembly. The reverse idler gear assembly includes an idler gear member, a synchronizer member and a retainer member. The synchronizer member has a pair of tabs that engage grooves on an idler shaft and interface with a synchronizer spring to apply a force from the synchronizer member on the retainer member and create a braking friction to slow down the idler gear assembly and the input shaft prior to meshing with the gear of the output shaft.

17 Claims, 10 Drawing Sheets

TRANSMISSION WITH REVERSE IDLER GEAR BRAKE

FIELD

The present disclosure relates generally to transmissions and more specifically to manual transmissions having an idler gear brake employed to reduce gear clash when shifting into a reverse gear ratio.

BACKGROUND

The statements in this section merely provide background information related to the present disclosure and may or may not constitute prior art.

A typical manual transmission includes a plurality of shafts, gears, shift mechanisms, synchronizers or other torque-transmitting mechanisms that cooperate to provide a plurality of forward and reverse gear or speed ratios. The transmission input shaft is selectively connected to an engine output shaft and includes a number of gears that are selectively connectable to the input shaft using, for example, synchronizers. The gears of the input shaft mesh with corresponding gears that are selectively connectable to an output shaft. To achieve a particular forward gear ratio between the transmission input and output shafts, the driver operates a shift mechanism, such as a manual shifter, that controls the engagement of the synchronizers with the desired gears. To achieve a reverse gear ratio, an idler gear is used to slide between an input shaft gear and an output shaft gear to reverse the rotational direction of the output shaft, and thus the drive wheels.

The idler gear is free to rotate on an idler gear shaft and the idler gear is not necessarily rotating when the idler gear is engaged to the input shaft reverse gear. However, the input shaft reverse gear is often rotating at a high speed having only recently been disengaged from the engine output shaft. Once the idler gear is meshing with the input shaft reverse gear they will both be rotating at the same high speed. The idler gear must then engage the output shaft gear to complete the torque transfer to the output shaft. However, as often is the case, the output shaft is not rotating and may even be rotating in the opposite direction as the driver may be shifting into reverse before the vehicle has stopped moving forward. The meshing of the fast rotating idler gear with a stationary output gear causes an impact or gear clash that creates noise and grinding that is very objectionable to the driver. Furthermore, gear clash is detrimental to the long term durability of the transmission and is the source of costly customer repair bills.

Accordingly, there is room in the art for a transmission that includes a mechanism to reduce or eliminate gear clash and premature component wear by reducing the input shaft and idler gear rotational speed when the driver is shifting into a reverse gear ratio.

SUMMARY

A transmission having a first and a second shaft supported in parallel by a housing is provided including a first gear member rotatably supported by the first shaft, a second gear member rotatably supported by the second shaft and a third shaft disposed parallel to the first and second shafts. The third shaft has a first end and at least one groove. The first end is supported by the housing and the groove is disposed axially on the third shaft. The transmission further includes an idler gear assembly rotatably supported by the third shaft. The idler gear assembly includes an idler gear member, a synchronizer member, an annular retainer member and a synchronizer spring. The idler gear member has a first side, a second side opposite the first side and a conical first hub extending from the first side. The synchronizer member has an annular conical first portion having a small diameter first end, and an annular second portion that partially encloses the first end of the first portion. The synchronizer member is disposed adjacent the hub of the idler gear member. The second portion of the synchronizer member has at least one radially extending tab disposed in the groove of the idler shaft. The annular retainer member is disposed proximate the synchronizer member and idler gear member. The retainer member has an inner conical surface adjacent to an outer surface of the synchronizer member. The synchronizer spring is disposed on the third shaft. The synchronizer spring has a base and at least one arm. The arm has a first end attached predominantly perpendicular the base. The arm is disposed in the groove of the third shaft. The idler gear assembly is selectively axially moveable along the third shaft to engage the first and second gear members.

In one example of the present invention, the transmission further includes a selectively operated linkage member. The idler gear member further includes a second hub extending from the second side. The second hub has a radial groove. The selectively operated linkage member is disposed in the groove of the second hub of the second side of the idler gear.

In another example of the present invention, the groove of the third shaft includes a brake portion having a first end including an angled portion.

In yet another example of the present invention, the radially extending tab of the synchronizer member includes an angled portion.

In yet another example of the present invention, the arm of the synchronizer spring has a second end and a radially extending portion. The second end is opposite the first end of the arm and the radially extending portion is disposed proximate the second end of the arm.

In yet another example of the present invention, the idler gear assembly is selectively disposed in at least one of a first, a second and a third position. In the first position, the idler gear assembly is not contacting the first gear member and the second gear member. In the second position, the idler gear assembly is meshed with the first gear member of the first shaft. The angled portion of the tab of the synchronizer member contacts the angled portion of the brake portion of the groove of the third shaft. The outer surface of the synchronizer member contacts the inner surface of the retainer member. In the third position, the idler gear assembly is meshed with both the first gear member of the first shaft and the second gear member of the second shaft.

In yet another example of the present invention, the retainer member has a flange immovably fixed to the first side of the idler gear member.

In yet another example of the present invention, the idler gear member includes a bearing disposed on an inner perimeter of the idler gear member.

Further objects, aspects and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
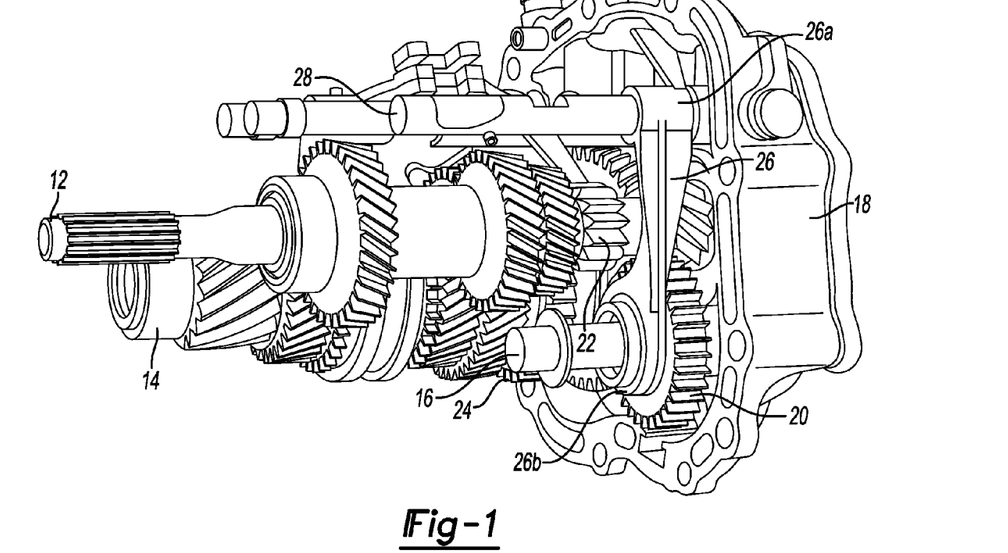
FIG. 1 is a perspective view of a transmission according to the present disclosure.

Referring to the drawings, wherein like reference numbers refer to like components, in FIG. 1 a perspective view of a partial transmission 10 of the present invention is illustrated. The transmission 10 includes an input shaft 12, a main shaft or output shaft 14 and an idler shaft 16 each supported by a housing 18. The input shaft 12 is connected to, for example, an engine output shaft (not shown) and the main shaft 14 is connected to, for example, a vehicle drive shaft (not shown) that provides torque to a drive wheel of the vehicle. The input and main shafts 12, 14 rotatably support a plurality of gears that intermesh to form a plurality of gear sets 15. A plurality of synchronizers 17 are selectively manipulated to achieve a desired forward gear ratio between the input shaft 12 and the main shaft 14. For example, to achieve a forward gear ratio, one of the plurality of synchronizers 17 is engaged to couple a gear from one of the gear sets 15 to one of the input shaft 12 and the main shaft 14 in order to transfer torque from the input shaft 12 to the main shaft 14.

The idler shaft 16 is fixed securely with the housing 18 and supports an idler gear assembly 20. The idler gear assembly 20 is capable of selective movement along the idler shaft 16 to engage a reverse gear or member 22 of the input shaft 12 and a sleeve gear or member 24 on the main shaft 14. When a reverse gear ratio is desired, the idler gear assembly 20 meshes independently with the reverse gear 22 that is engaged with the input shaft 12 and the sleeve gear 24 that is engaged with the main shaft 14. The engaged idler gear assembly 20 reverses the direction of the sleeve gear 24 of the main shaft 14 and therefore reverses the direction of rotation of the drive shaft of the vehicle. For example, the idler gear assembly 20 is manipulated by a shift fork linkage 26 that includes a first end 26A secured to a reverse shaft or member 28 operated by the driver and a second end 26B that engages and moves the idler gear assembly 20 axially along the idler shaft 16. However, other methods or mechanisms of manipulating the idler gear assembly 20 may be employed without departing from the scope of the present invention.

Figure 2A:
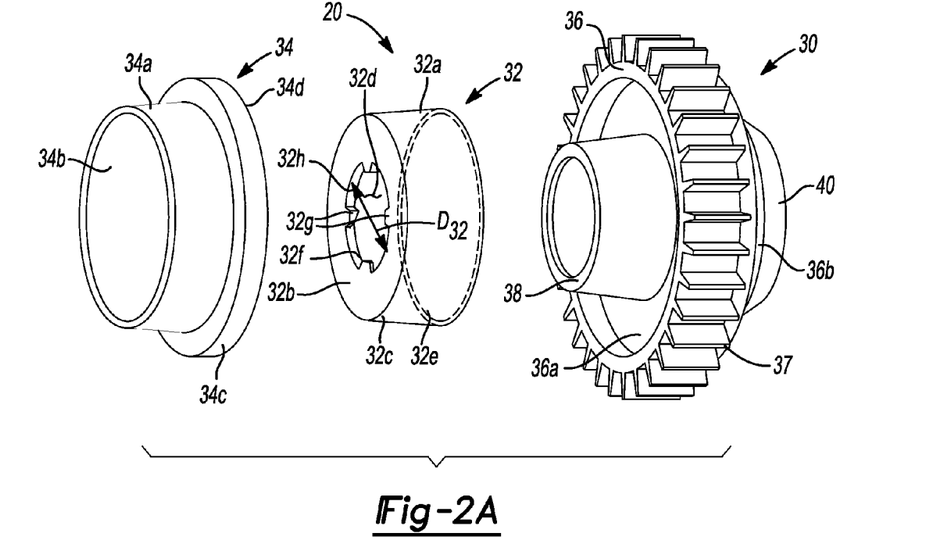
FIG. 2A is an exploded perspective view of a reverse idler gear assembly according to the present disclosure.
Figure 2B:
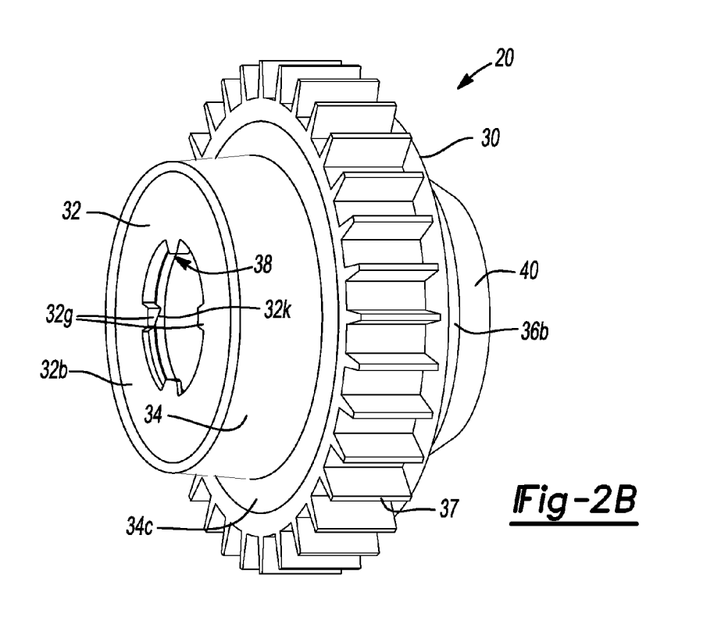
FIG. 2B is a perspective view of the reverse idler gear assembly.

Referring now to FIGS. 2A and 2B, an example of the idler gear assembly 20 is illustrated in a disassembled state in FIG. 2A, and assembled in FIG. 2B. The idler gear assembly 20 includes an idler gear member 30, a synchronizer member 32 and a retainer member 34. The idler gear member 30 has a meshing gear portion 36. The gear portion 36 includes a plurality of gear teeth 37 configured to slidably mesh with another rotating gear. The idler gear member 30 further includes a conical brake hub 38 on a first side 36A of the gear portion 36 and a grooved linkage hub 40 on a second side 36B of the gear portion 36. An inner diameter 36C of the idler gear member 30 includes a bearing 36D to improve rotational losses due to friction and wear.

The synchronizer member 32 has a first portion 32A having an annular conical shape and a second portion or retaining plate 32B that partially covers a small diameter end 32C of the first portion 32A. The first portion 32A includes an inner surface 32D adjacent the brake hub 38 and an outer surface 32E. The second portion 32B has an opening 32F that includes at least one tab 32G, and preferably four tabs 32G, extending radially inward from an inner perimeter 32H of the opening 32F. The inner perimeter 32H of the second portion 32 has a diameter $D_{32}$ slightly larger that the diameter $D_{16}$ of the idler shaft 16.

The retainer member 34 includes a first portion 34A having an annular conical shape and includes an inner surface 34B that mimics the shape of the outer surface 32E of the first portion 32A of the synchronizer member 32. The retainer member 34 further includes a retainer flange 34C on an end 34D of the retainer member 34. The inner surface 34B of the retainer member 34 has a surface finish that provides a proper amount of friction required for the optimization of braking performance, as is described in more detail below.

Referring now to FIG. 2B, the three members 30, 32, 34 of the idler gear assembly 20 are illustrated assembled wherein the synchronizer member 32 fits overtop the brake hub 38 of the idler gear member 30 and the retainer member 34 fits overtop the synchronizer member 32. Accordingly, the inner surface 32D of the synchronizer member 32 is adjacent the brake hub 38 of the idler gear member 30 and the inner surface 34B of the retainer member 34 is adjacent the outer surface 32E of the synchronizer member 32. The retainer flange 34C of the retainer member 34 is fixedly press-fit to the idler gear member 30 although other methods of fixing the retainer member 34 to the idler gear member 30 may be employed without departing from the scope the present invention. The synchronizer member 32 is able to rotate within the assembly 20 and has minimal axial freedom of movement, however, the synchronizer member 32 is generally contained between the first portion 34A of the retainer member 34 and the brake hub 38 of the idler gear member 30.

Figure 3A:
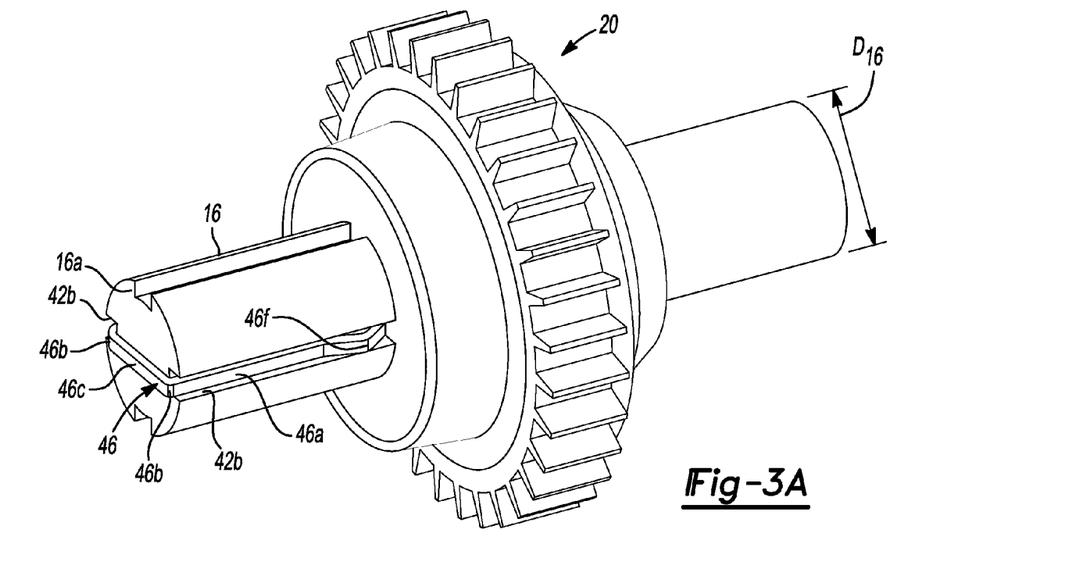
FIG. 3A is a perspective view of the idler gear assembly as installed on a idler shaft including a synchronizer spring according to the present disclosure.
Figures 3B, 3C, 3D:
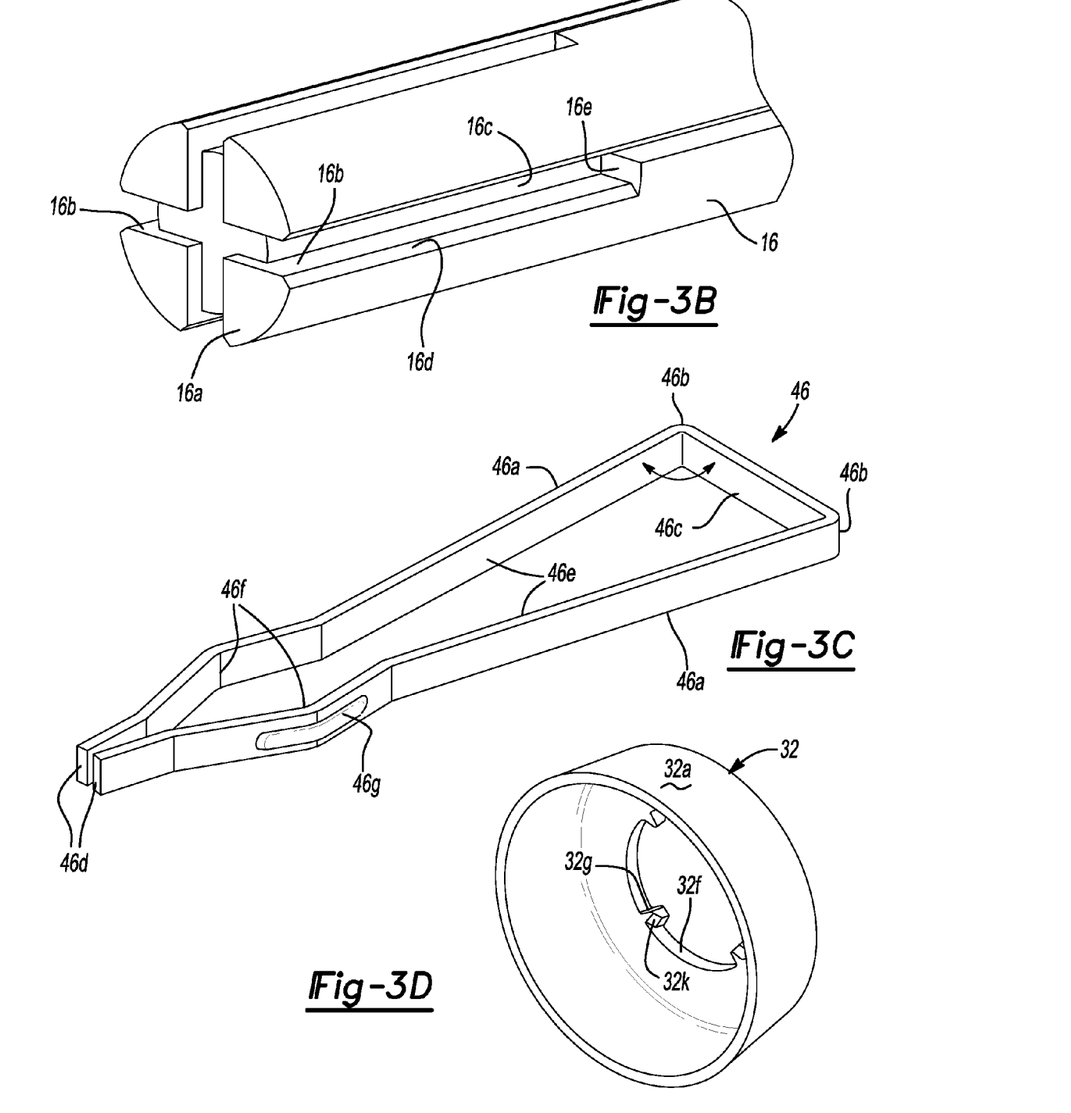
FIG. 3B is a perspective view of the synchronizer spring according to the present disclosure.
FIG. 3C is a perspective view of a portion of the idler shaft according to the present disclosure.
FIG. 3D is a perspective view of a synchronizer member of the idler gear assembly according to the present disclosure.

Turning now to FIG. 3A, the idler gear assembly 20 is shown mounted on the idler shaft 16. The idler gear assembly 20 is secured to the idler shaft 16 by a synchronizer spring 46. Turning briefly to FIG. 3B, the idler shaft 16 has a first end 16A and at least one but preferably four grooves 16B that extend along the axial length of the idler shaft 16. The grooves 16B include a base portion 16C and a brake portion 16D having an angled first end 16E. The grooves 16B are sized to receive the synchronizer spring 46 and the tabs 32G of the idler gear assembly 20, as will be described in greater detail below.

Turning to FIG. 3C, the synchronizer spring 46 has a pair of arms 46A connected at a first end 46B to a base 46C and extending in a direction predominantly perpendicular from the base 46C. The arms 46A each have a second end 46D opposite the first end 46B and include a straight portion 46E proximate the first end 46B and a spring or radially extending portion 46F proximate the second end 46D. The radially extending portion 46F may include a raised portion 46G.

Turning to FIG. 3D, a close-up view of the synchronizer member 32 is shown detailing the tabs 32G. Each of the tabs 32G include an angled portion 32K adjacent to the inner perimeter 32H of the synchronizer member 32.

Returning to FIG. 3A, each tab 32G of the synchronizer member 32 is disposed in one of the grooves 16B of the idler shaft 16. The tabs 32G of the synchronizer member 32 rotationally lock the synchronizer member 32 to the idler shaft 16 while the idler gear member 30 and the retainer member 34 are free to rotate on the idler shaft 16. The synchronizer spring 46 is disposed such that the straight portions 46E of the arms 46A are adjacent the base 16C of the grooves 16A of the idler shaft 16. The radially extending portion 46F of the arms 46A is separated from the idler shaft 16 to provide space for the radially extending portion 46F to displace when a force is applied on the radially extending portion 46F. The second end 46D of the arm is formed to contact the base 16C of the groove 16B of the idler shaft 16. The tabs 32G of the synchronizer member 32 extend inward towards the base 16C of the groove 16B disposing the arms 46A of the synchronizer spring 46 between the tabs 32G of the synchronizer member 32 and the base 16C of the groove 16B of the idler shaft 16. Additionally, the synchronizer spring 46 is installed on the idler shaft so that the base 46C of the synchronizer spring 46 is disposed adjacent the first end 16A of the idler shaft 16.

Figure 4A:
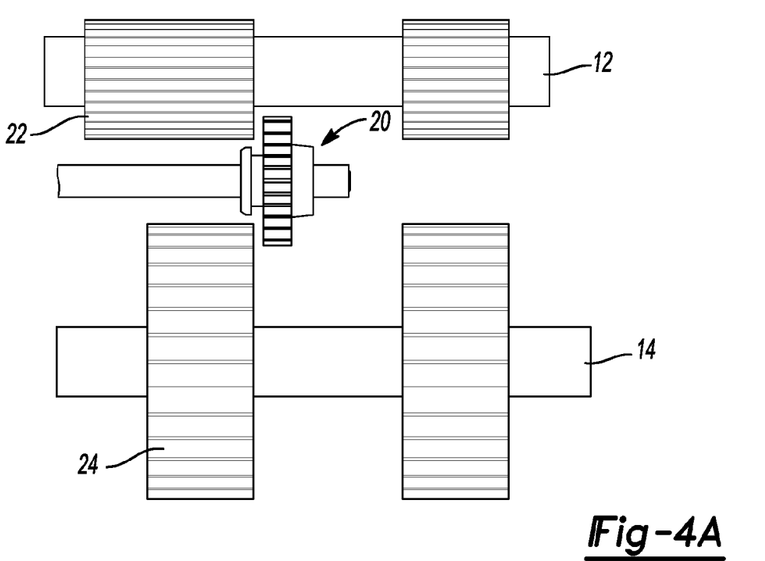
FIG. 4A is a schematic view of the reverse idler gear assembly in a neutral position according to the present disclosure.
Figure 4B:
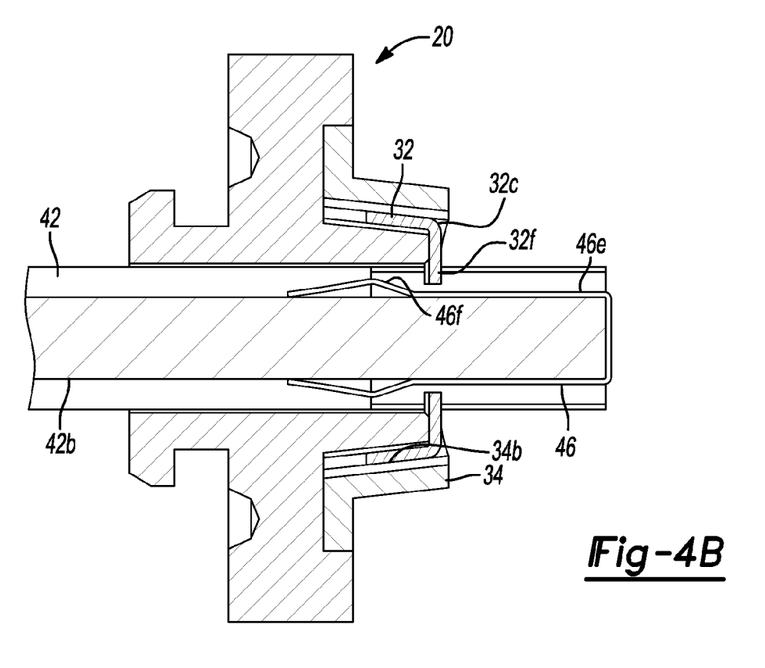
FIG. 4B is a cross-section view of the reverse idler gear assembly and idler shaft in the neutral position according to the present disclosure.
Figure 4C:
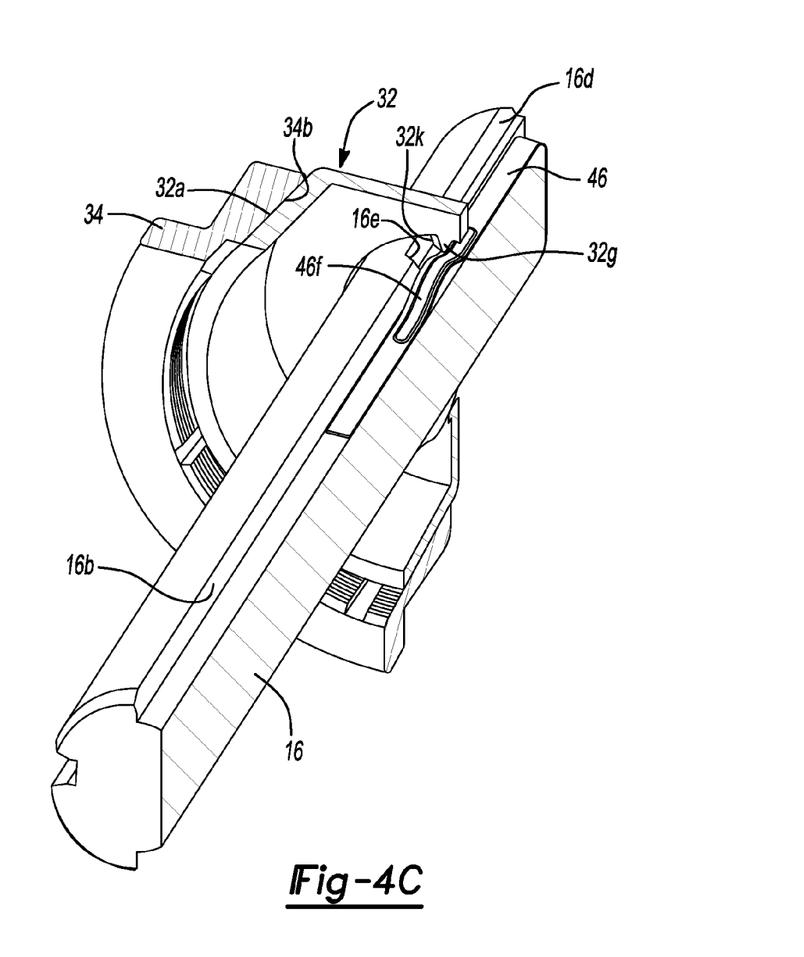
FIG. 4C is a cut-away view of a synchronizer member, a retainer member and the idler shaft in the neutral position according to the present disclosure.
Figure 5A:
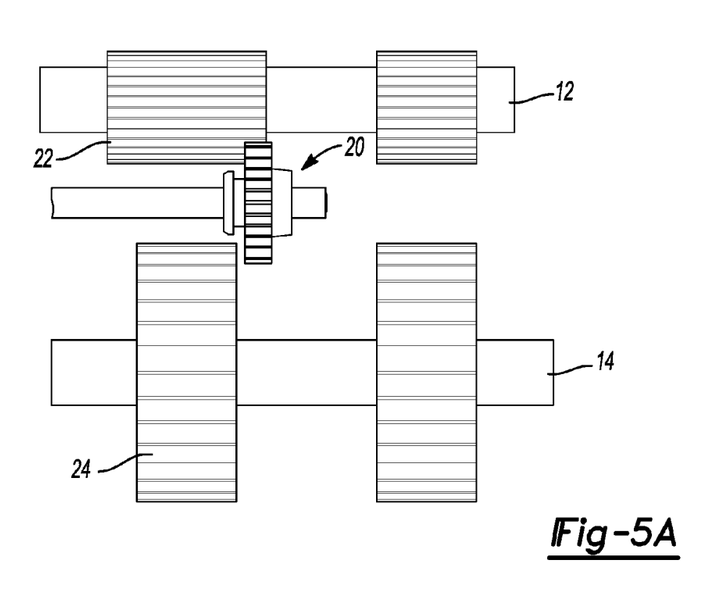
FIG. 5A is a schematic view of the reverse idler gear assembly in a brake position according to the present disclosure.
Figure 5B:
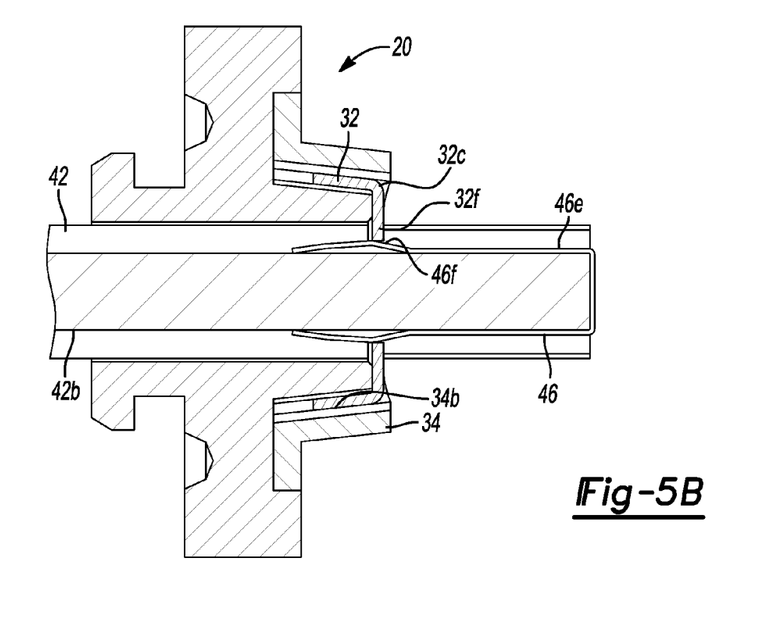
FIG. 5B is a cross-section view of the reverse idler gear assembly and idler shaft in the brake position according to the present disclosure.
Figure 5C:
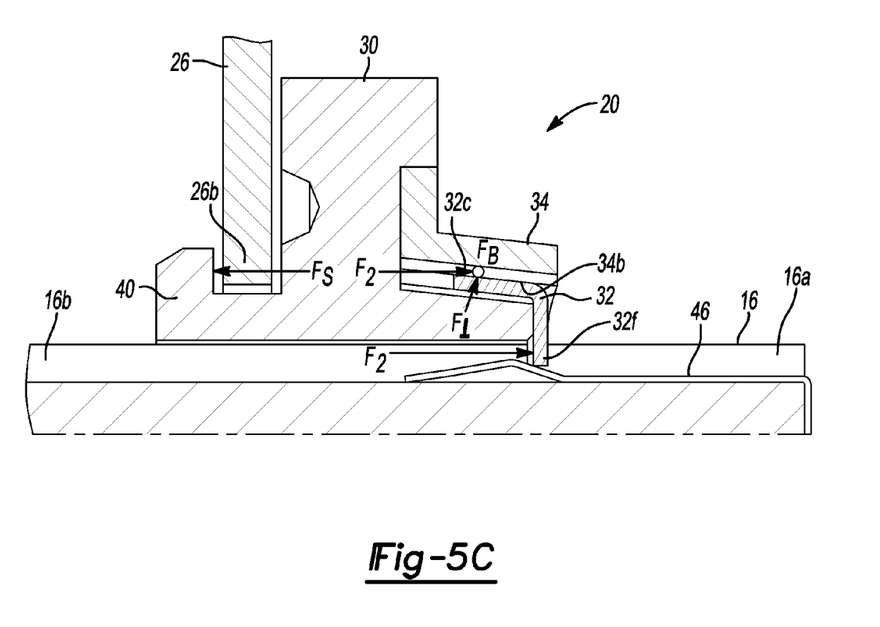
FIG. 5C is a close-up cross-section view of the reverse idler gear assembly and idler shaft in the brake position and including a force diagram.
Figures 5D, 5E:
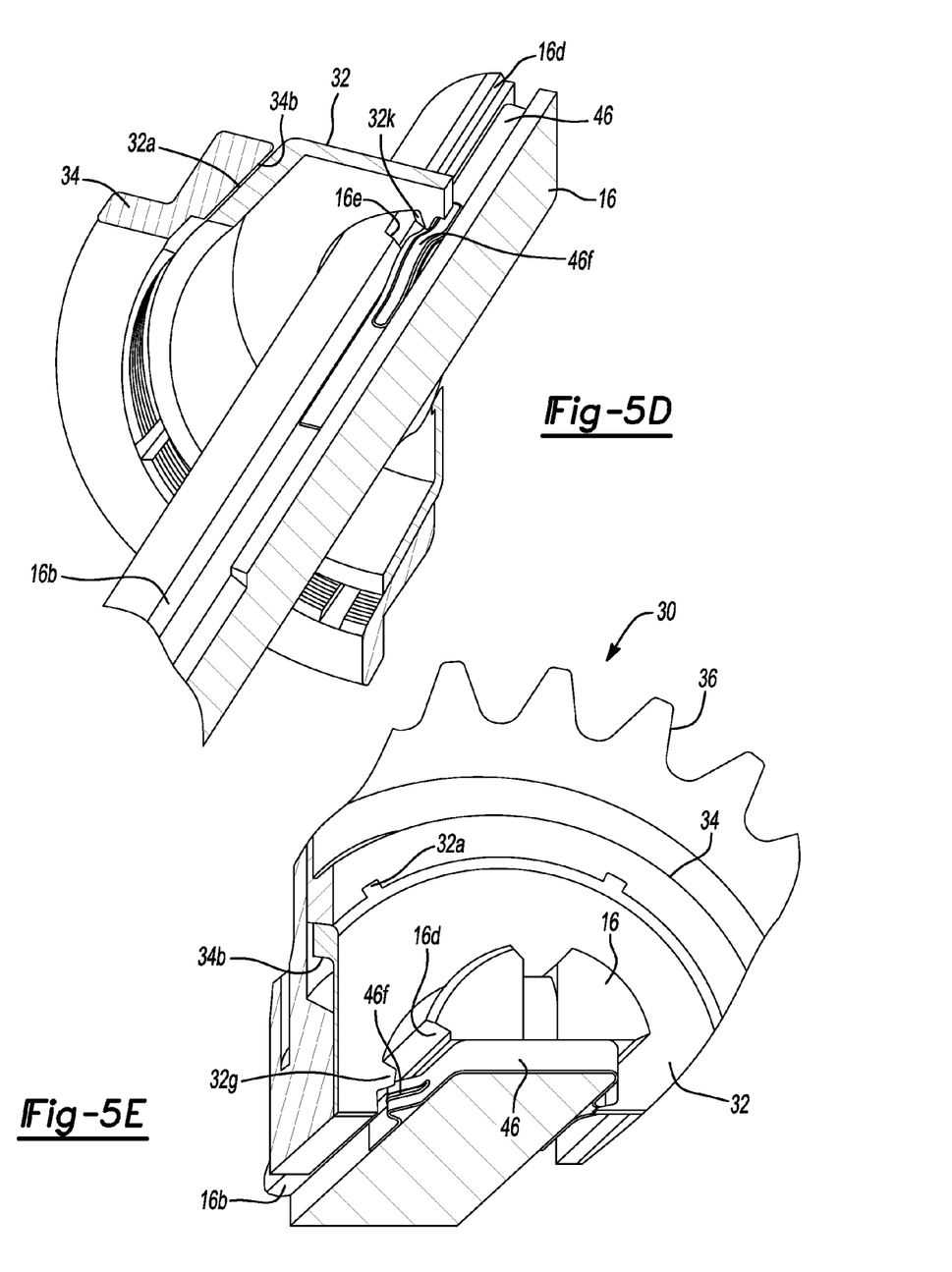
FIG. 5D is a cut-away view of the synchronizer member, the retainer member and the idler shaft in the brake position according to the present disclosure.
FIG. 5E is a cut-away, close-up view of the synchronizer member, the retainer member and the idler shaft in the brake position according to the present disclosure.
Figure 6A:
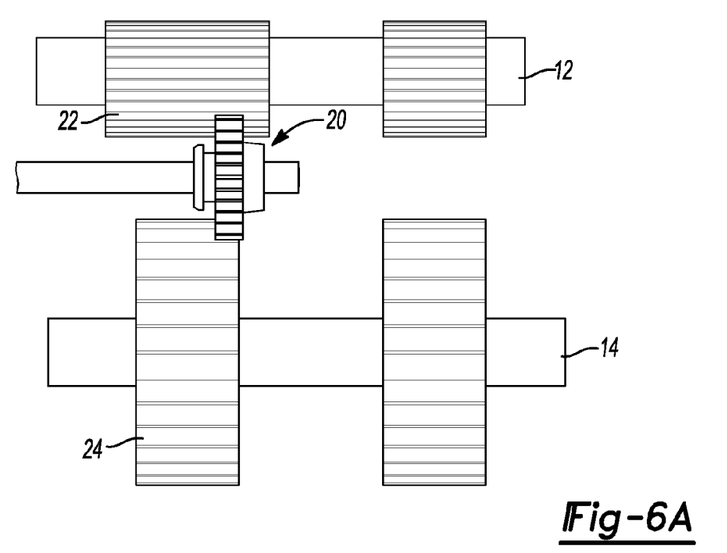
FIG. 6A is a schematic view of the reverse idler gear assembly in an engaged position according to the present disclosure.
Figure 6B:
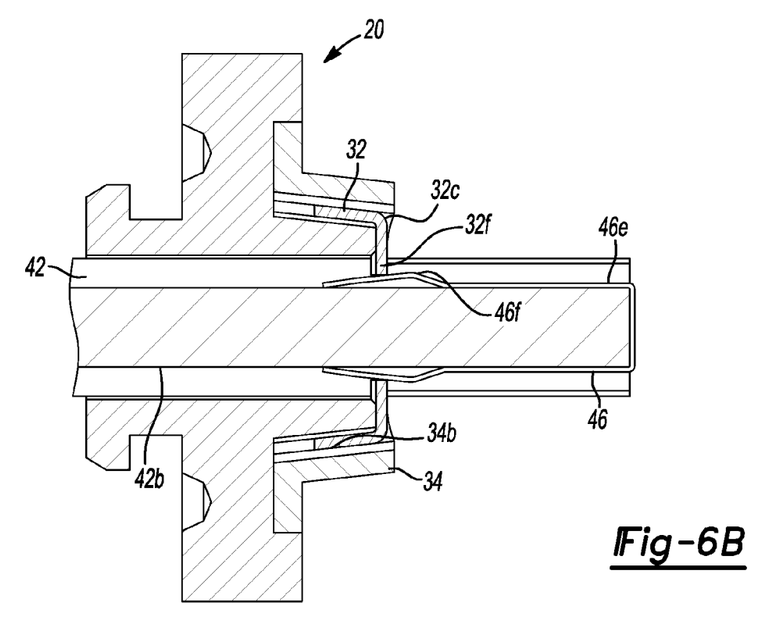
FIG. 6B is a cross-section view of the reverse idler gear assembly and idler shaft in the engaged position according to the present disclosure.

Turning generally now to FIGS. 4A-6B, a schematic of the idler gear assembly 20 in relation to the input and main shafts 12, 14 of the transmission 10 is illustrated in each of three positions in FIGS. 4A, 5A and 6A. FIGS. 4B, 5B, and 6B illustrate a cross-section of the idler gear assembly 20 positioned in relation to the idler shaft 16 and synchronizer spring 46 in the three positions. FIGS. 4C, 5C-F and 6C further detail through cut-away illustrations the idler gear assembly in each of the three positions. In a disengaged first position, as shown in FIGS. 4A, 4B and 4C, the idler gear assembly 20 does not contact or mesh with either of the reverse gear 22 of the input shaft 12 or the sleeve gear 24 of the main shaft 14. Additionally, the cross-section of FIG. 4B shows the idler gear assembly 20 in the disengaged position where the tabs 32G of the synchronizer member 32 are disposed proximate the straight portion 46E of arms 46A of the synchronizer spring 46. In the first position 50, the synchronizer spring 46 does not exert any force on the synchronizer member 32 of the idler gear assembly 20. Therefore, the synchronizer member 32 does not exert any force on the retainer member 34 in the idler gear assembly 20.

In a partially engaged second position, as shown in FIGS. 5A-F, the idler gear assembly 20 contacts and meshes with the reverse gear 22 of the input shaft 12 but does not yet contact or mesh with the sleeve gear 24 of the main shaft 14. Additionally, the cross-section of FIG. 5B shows the idler gear assembly 20 and idler shaft 16 so that the tabs 32G of the synchronizer member 32 are disposed adjacent and initially in contact with the radially extending portion 46F of the arms 46A of the synchronizer spring 46.

Turning momentarily to FIG. 5C, a close-up cross-section of a partial idler gear assembly 20, idler shaft 16 and shift fork linkage 26 is shown in the second position. As the operator shifts the transmission into reverse, the shift fork linkage 26 moves the idler gear assembly 20 axially by exerting a shift force $F_S$ on the grooved linkage hub 40 of the idler gear assembly 20. As the idler gear assembly 20 slides axially down the idler shaft 16 towards the reverse gear 22 of the input shaft 12 the tabs 32G of the synchronizer member 32 engage with the radially extending portion 46F of the synchronizer spring 46. A resulting first axial force $F_1$ is applied to the tab 32G. The force $F_1$ pushes the synchronizer member 32 axially relative to the retainer member 34, bringing the outer surface 32C of the synchronizer member 32 in contact with the inner surface 34B of the retainer member 34. This initial contact between the synchronizer member 32 and the retainer member 34 creates enough friction to rotate the synchronizer member 32 such that the tabs 32G of the synchronizer member 32 move into the brake portion 16D of the groove 16. As the synchronizer member 32 continues to move axially, the angle portion 32K of the tabs 32G contact the angle portion 16E of the brake portion 16D of the groove 16. The contact between the angle portions 32K and 16E of the tabs 32G and the grooves 16 create a greater second axial force $F_2$ reengaging the outer surface 32C of the synchronizer member 32 and the inner surface 34B of the retainer member 34. The force $F_2$ exerted on the synchronizer member 32 is transferred to act on the retainer member 34 and has a perpendicular force $F_\perp$ component, relative to the surfaces 32C, 34B of the synchronizer member 32 and retainer member 34. The force $F_\perp$ combines with a coefficient of friction $\mu$ of the surfaces 32B, 34C to create a brake friction force $F_B$ that slows the rotational speed of the retainer member 34 and idler gear assembly 20, according to the following formula:

$$F_B = \mu * F_\perp \tag{1}$$

The coefficient of friction $\mu$ of the retainer member 34 and the synchronizer member 32 and a stiffness or spring constant $K_S$ of the synchronizer spring 46 are optimized to achieve the desired braking force $F_B$ required. For example, for improved performance of the transmission of the present invention, the surface finishes, spring stiffness and angle portions 32K, 16E of the tabs 32G and grooves 16 are chosen to provide enough brake force $F_B$ to overcome the rotational inertia and reduce the rotational speed of the idler gear assembly 20 to 150 revolutions per minute (RPM) prior to engaging the sleeve gear 24 of the main shaft 14. However, the force $F_\perp$ also has an effect on the shift force $F_S$ required from the driver to slide the idler gear assembly 20 along the idler gear shaft 16. If too much effort is required, the driver may find the operation of the transmission objectionable regardless of the sound quality of the engagement of gears.

Figure 6C:
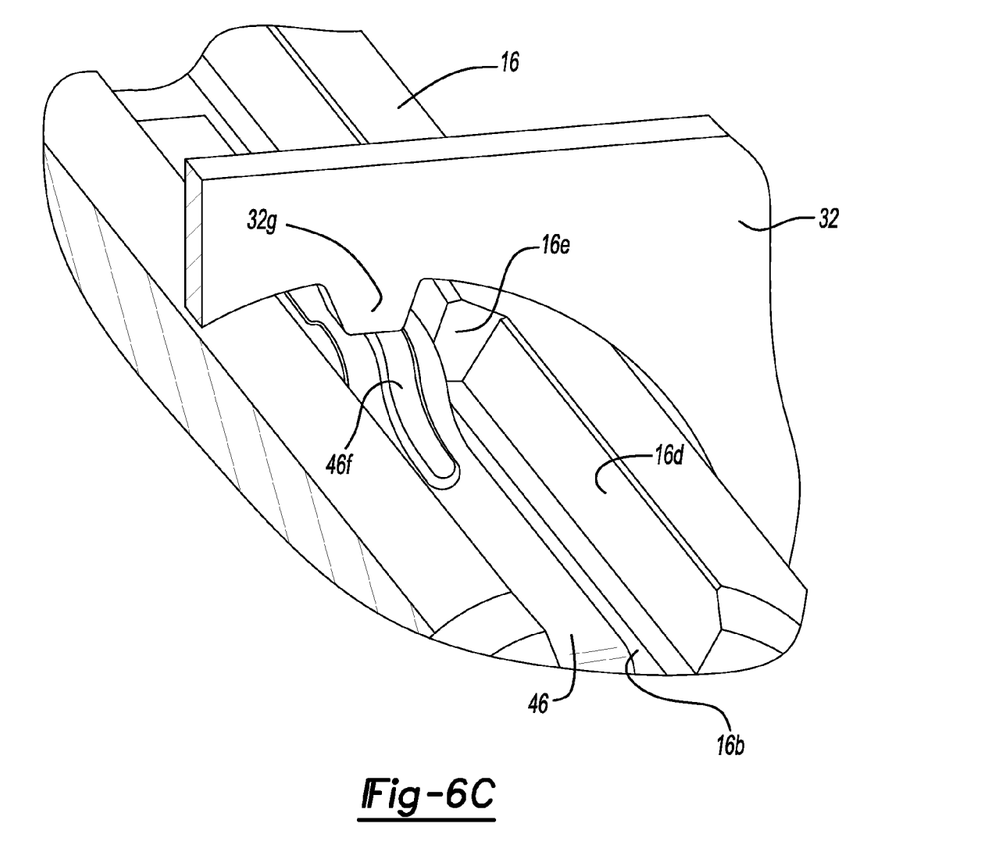
FIG. 6C is a cut-away view of the synchronizer member, the retainer member and the idler shaft in the engaged position according to the present disclosure.

In a fully engaged third position, as shown in FIGS. 6A-C, the idler gear assembly 20, already meshing with the reverse gear 22 of the input shaft 12, is positioned in contact and meshing with the sleeve gear 24 of the main shaft 14. Additionally, the cross-section of FIG. 6B shows the idler gear assembly 20 and idler shaft 16 so that the tabs 32G of the synchronizer member 32 are disposed adjacent and in contact with the radially extending portion 46F of the arms 46A of the synchronizer spring 46, however, the tabs 32G are closer to the second end 46D of the synchronizer spring 46. Achieving this position requires the continued axial movement of the idler gear 20 on the idler shaft 16 such that the angled portion 32K of the tabs 32G slide along the angled portions 16E of the groove 16 thus positioning the tabs 32G back into the groove 16 and in contact with the radially extending portion 46F of the arms 46A of the synchronizer spring 46. Since the idler gear assembly 20 is slowed to less than 150 RPM in the second position 52, the idler gear assembly 20 smoothly meshes with the stationary sleeve gear 24 of the main shaft 14. The smoothly meshing of the reverse and sleeve gears 22, 24 eliminates a crash or scratching that would otherwise occur with the idler gear assembly 20 rotating at much higher RPM and meshing with the stationary sleeve gear 24.

The idler gear member 30, the reverse gear 22 of the input shaft 12 and the sleeve gear 24 of the main shaft 14 employ gear teeth designed to slidably engage each other as opposed to radially engage. Sliding two gears together for meshing requires that they are revolving at relatively similar speeds and in the same direction. When gears are forced together that are rotating at dissimilar speeds or in opposite directions the resulting gear clash causes objectionable noise and damage to the components. The reverse idler gear brake mechanism of the present invention provides a device that slows the input shaft 12 and idler gear member 30 prior to meshing with the main shaft 14 sleeve gear 24 eliminating gear clash and the noise and component damage that it causes.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A transmission having a first and a second shaft supported in parallel by a housing, the transmission comprising:
   a first gear member rotatably supported by the first shaft;
   a second gear member rotatably supported by the second shaft;
   a third shaft disposed parallel to the first and second shafts, the third shaft having a first end and at least one groove, and wherein the first end is supported by the housing and the groove is disposed axially on the third shaft;
   an idler gear assembly rotatably supported by the third shaft, the idler gear assembly comprising:
      an idler gear member having a first side, a second side opposite the first side and a conical first hub extending from the first side;
      a synchronizer member having an annular conical first portion having a small diameter first end, and an annular second portion that partially encloses the first end of the first portion, and wherein the synchronizer member is disposed adjacent the hub of the idler gear member, the second portion of the synchronizer member has at least one radially extending tab disposed in the groove of the idler shaft;
      an annular retainer member disposed proximate the synchronizer member and idler gear member, the retainer member having an inner conical surface adjacent to an outer surface of the synchronizer member; and
   a synchronizer spring disposed on the third shaft, the synchronizer spring having a base and at least one arm, and wherein the arm has a first end attached predominantly perpendicular the base, and wherein the arm is disposed in the groove of the third shaft; and
   wherein the idler gear assembly is selectively axially moveable along the third shaft to engage the first and second gear members.

2. The transmission of claim 1 further comprising:
   a selectively operated linkage member; and
   wherein the idler gear member further includes a second hub extending from the second side, and wherein the second hub has a radial groove; and
   wherein the selectively operated linkage member is disposed in the groove of the second hub of the second side of the idler gear.

3. The transmission of claim 1 wherein the groove of the third shaft includes a brake portion having a first end including an angled portion.

4. The transmission of claim 3 wherein the radially extending tab of the synchronizer member includes an angled portion.

5. The transmission of claim 4 wherein the arm of the synchronizer spring has a second end and a radially extending portion, and wherein the second end is opposite the first end of the arm and the radially extending portion is disposed proximate the second end of the arm.

6. The transmission of claim 5 wherein the idler gear assembly is selectively disposed in at least one of a first, a second and a third position, and wherein:
   in the first position, the idler gear assembly is not contacting the first gear member and the second gear member;
   in the second position, the idler gear assembly is meshed with the first gear member of the first shaft, and wherein the angled portion of the tab of the synchronizer member contacts the angled portion of the brake portion of the groove of the third shaft, and wherein the outer surface of the synchronizer member contacts the inner surface of the retainer member; and
   in the third position, the idler gear assembly is meshed with both the first gear member of the first shaft and the second gear member of the second shaft.

7. The transmission of claim 1 wherein the retainer member has a flange immovably fixed to the first side of the idler gear member.

8. The transmission of clam 1 wherein the idler gear member includes a bearing disposed on an inner perimeter of the idler gear member.

9. A transmission having a first and a second shaft supported in parallel by a housing, the transmission comprising:
   a first gear member rotatably supported by the first shaft;
   a second gear member rotatably supported by the second shaft;
   a third shaft disposed parallel to the first and second shafts, the third shaft having a first end and at least one groove, and wherein the first end is supported by the housing and the groove is disposed axially on the third shaft;
   an idler gear assembly rotatably supported by the third shaft, the idler gear assembly comprising:
      an idler gear member having a first side, a second side opposite the first side, a conical first hub extending from the first side and a second hub extending from the second side, and wherein the second hub has a radial groove;

a synchronizer member having an annular conical first portion having a small diameter first end, and an annular second portion that partially encloses the first end of the first portion, and wherein the synchronizer member is disposed adjacent the hub of the idler gear member, the second portion of the synchronizer member has at least one radially extending tab disposed in the groove of the idler shaft;

an annular retainer member disposed proximate the synchronizer member and idler gear member, the retainer member having an inner conical surface adjacent to an outer surface of the synchronizer member; and a synchronizer spring disposed on the third shaft, the synchronizer spring having a base and at least one arm, and wherein the arm has a first end attached predominantly perpendicular the base, and wherein the arm is disposed in the groove of the third shaft;

a selectively operated linkage member partially disposed in the groove of the hub of the second side of the idler gear; and wherein the idler gear assembly is selectively axially moveable along the third shaft to engage the first and second gear members.

10. The transmission of claim 9 wherein the arm of the synchronizer spring has a second end opposite the first end and a radially extending portion disposed proximate the second end of the synchronizer spring.

11. The transmission of claim 9 wherein the groove of the third shaft includes a brake portion having a first end including an angled portion.

12. The transmission of claim 11 wherein the radially extending tab of the synchronizer member includes an angled portion.

13. The transmission of claim 12 wherein the idler gear assembly is selectively disposed in at least one of a first, a second and a third position, and wherein:

in the first position, the idler gear assembly is not contacting the first gear member and the second gear member;

in the second position, the idler gear assembly is meshed with the first gear member of the first shaft, and wherein the angled portion of the tab of the synchronizer member contacts the angled portion of the brake portion of the groove of the third shaft, and wherein the outer surface of the synchronizer member contacts the inner surface of the retainer member; and in the third position, the idler gear assembly is meshed with both the first gear member of the first shaft and the second gear member of the second shaft.

14. The transmission of claim 9 wherein the retainer member has a flange immovably fixed to the first side of the idler gear member.

15. The transmission of claim 9 wherein the idler gear member includes a bearing disposed on an inner perimeter of the idler gear member.

16. A transmission having a first and a second shaft supported in parallel by a housing, the transmission comprising:

a first gear member rotatably supported by the first shaft;

a second gear member rotatably supported by the second shaft;

a third shaft disposed parallel to the first and second shafts, the third shaft having a first end and at least one groove, and wherein the first end is supported by the housing and the groove is disposed axially on the third shaft and wherein the groove includes a brake portion having a first end including an angled portion;

an idler gear assembly rotatably supported by the third shaft, the idler gear assembly comprising:

an idler gear member having a first side, a second side opposite the first side, a conical first hub extending from the first side and a second hub extending from the second side, and wherein the second hub has a radial groove;

a synchronizer member having an annular conical first portion having a small diameter first end, and an annular second portion that partially encloses the first end of the first portion, and wherein the synchronizer member is disposed adjacent the hub of the idler gear member, the second portion of the synchronizer member has at least one radially extending tab disposed in the groove of the idler shaft and wherein the radially extending tab includes an angled portion;

an annular retainer member disposed proximate the synchronizer member and idler gear member, the retainer member having an inner conical surface adjacent to an outer surface of the synchronizer member; and a synchronizer spring disposed on the third shaft, the synchronizer spring having a base and at least one arm, and wherein the arm has a first end, a second end opposite the first end and a radially extending portion, wherein the first end of the arm is attached predominantly perpendicular the base, wherein the radially extending portion is disposed proximate the second end of the arm, and wherein the arm is disposed in the groove of the third shaft;

a selectively operated linkage member partially disposed in the groove of the hub of the second side of the idler gear; and wherein the idler gear assembly is selectively axially moveable along the third shaft to engage the first and second gear members wherein the retainer member has a flange immovably fixed to the first side of the idler gear member and wherein the idler gear member includes a bearing disposed on an inner perimeter of the idler gear member.

17. The transmission of claim 16 wherein the idler gear assembly is selectively disposed in at least one of a first, a second and a third position, and wherein:

in the first position, the idler gear assembly is not contacting the first gear member and the second gear member;

in the second position, the idler gear assembly is meshed with the first gear member of the first shaft, and wherein the angled portion of the tab of the synchronizer member contacts the angled portion of the brake portion of the groove of the third shaft, and wherein the outer surface of the synchronizer member contacts the inner surface of the retainer member; and in the third position, the idler gear assembly is meshed with both the first gear member of the first shaft and the second gear member of the second shaft.

* * * * *